(12) United States Patent
Chiesa et al.

(10) Patent No.: US 8,033,372 B2
(45) Date of Patent: Oct. 11, 2011

(54) OVERRUNNING CLUTCH

(75) Inventors: Alfred J. Chiesa, Farmington Hills, MI (US); Damien J. Fron, Redford, MI (US)

(73) Assignee: GKN Sinter Metals, LLC, Auburn Hills, MI (US)

( * ) Notice: Subject to any disclaimer, the term of this patent is extended or adjusted under 35 U.S.C. 154(b) by 754 days.

(21) Appl. No.: 12/065,164

(22) PCT Filed: Aug. 31, 2006

(86) PCT No.: PCT/US2006/033999
§ 371 (c)(1),
(2), (4) Date: Jul. 15, 2008

(87) PCT Pub. No.: WO2007/027873
PCT Pub. Date: Mar. 8, 2007

(65) Prior Publication Data
US 2009/0145718 A1 Jun. 11, 2009

Related U.S. Application Data

(60) Provisional application No. 60/713,878, filed on Sep. 2, 2005.

(51) Int. Cl.
*F16D 41/12* (2006.01)
(52) U.S. Cl. .............................. 192/46; 192/71; 192/89.2
(58) Field of Classification Search ....................... 192/46
See application file for complete search history.

(56) References Cited

U.S. PATENT DOCUMENTS

| 1,883,966 | A | * | 10/1932 | Krause | 74/576 |
| 5,853,073 | A | | 12/1998 | Costin | |
| 6,202,813 | B1 | * | 3/2001 | Yahata et al. | 192/64 |
| 6,615,965 | B2 | | 9/2003 | Fitz et al. | |
| 7,100,756 | B2 | * | 9/2006 | Kimes et al. | 192/46 |
| 7,121,394 | B2 | * | 10/2006 | Chen | 192/64 |
| 2004/0016616 | A1 | | 1/2004 | Stefina | |
| 2004/0216975 | A1 | | 11/2004 | Ruth | |
| 2005/0139444 | A1 | | 6/2005 | Kanehisa et al. | |

OTHER PUBLICATIONS

International Search Report and Written Opinion corresponding to PCT/US2006/033999 under date of mailing of Mar. 5, 2007.

* cited by examiner

*Primary Examiner* — Richard M. Lorence
(74) *Attorney, Agent, or Firm* — Quarles & Brady LLP

(57) ABSTRACT

An overrunning clutch has a first race, a second race, a set of pawls between the first race and the second race and a set of springs between the first race and the second race, one spring for each pawl and each corresponding spring biasing the corresponding pawl into a position in which the first race and the second race are engaged with each other in a driving direction and are disengaged from each other in a free wheeling direction. Each spring is received in a spring receiving recess of one of the races and biases a rearward portion of the corresponding pawl radially inwardly into a pawl receiving recess of the race.

13 Claims, 6 Drawing Sheets

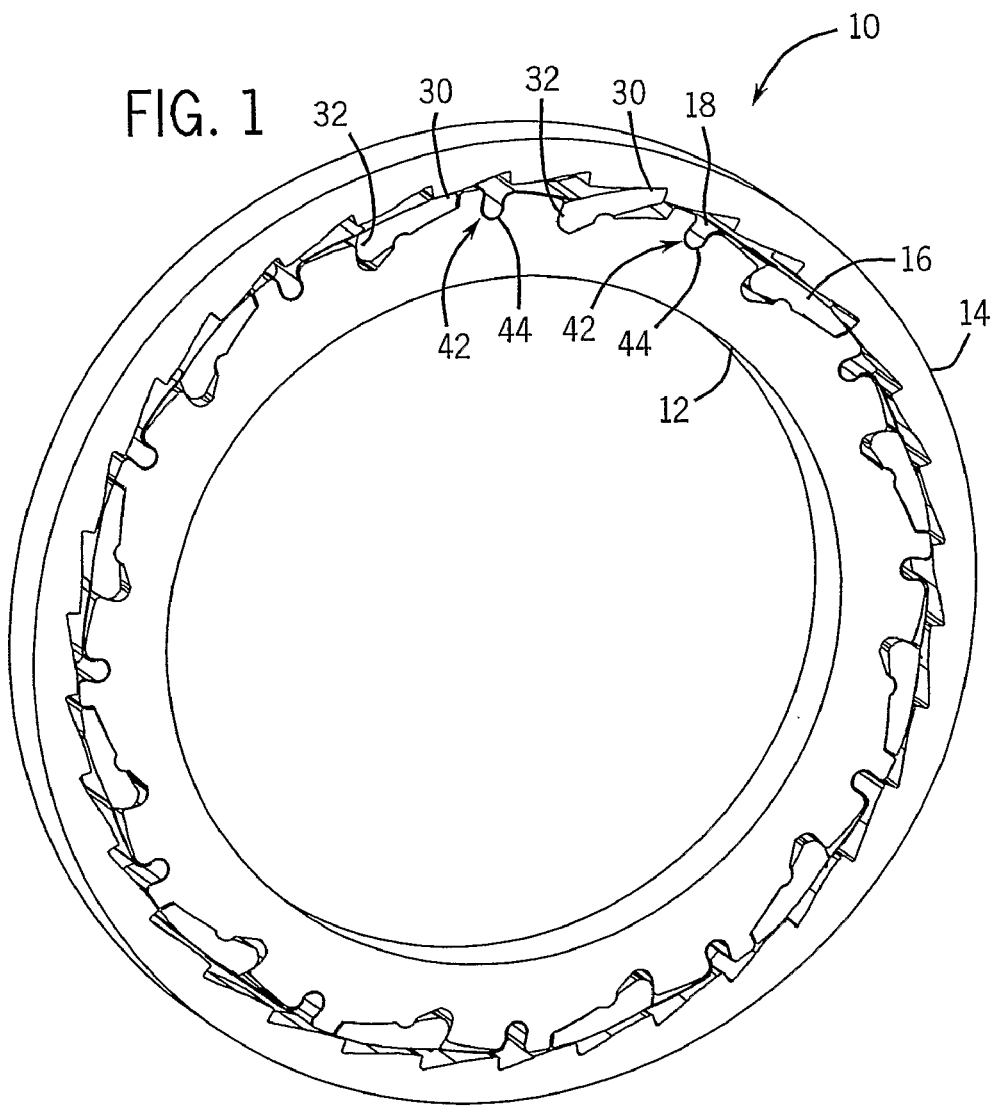
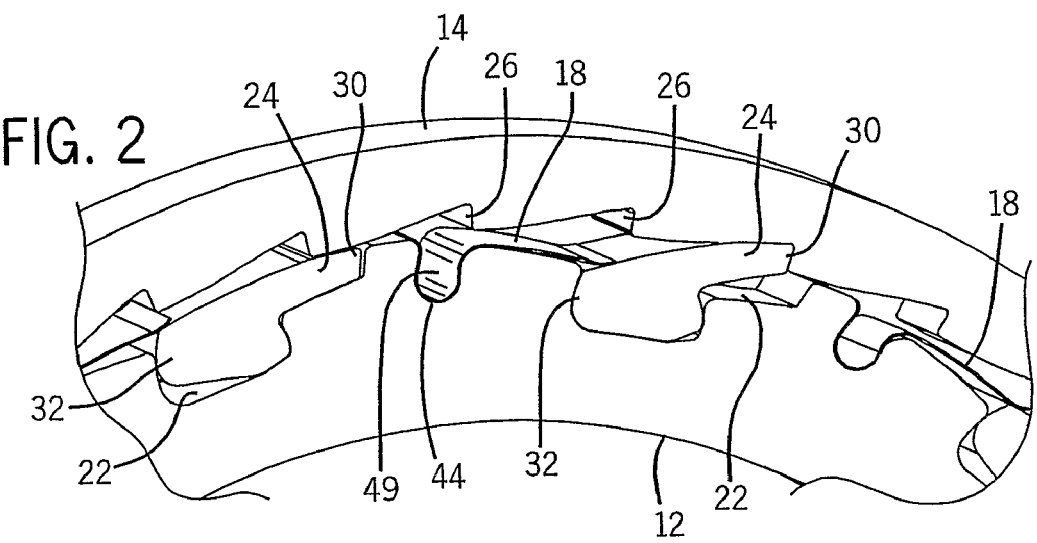

OVERRUNNING CLUTCH

CROSS-REFERENCE TO RELATED APPLICATION

This claims the benefit of U.S. Provisional Patent Application No. 60/713,878 filed Sep. 2, 2005.

STATEMENT CONCERNING FEDERALLY SPONSORED RESEARCH OR DEVELOPMENT

Not applicable.

FIELD OF THE INVENTION

The invention relates to one-way, or overrunning, clutches and particularly to such clutches for automotive transmission applications.

BACKGROUND OF THE INVENTION

One-way or overrunning clutches are used in a variety of power transmission applications. Bicycles, scooters, motorcycles, and automobiles all can have one or more overrunning clutches. The overrunning clutch transmits torque in one rotary driving direction but not the other. In some automotive applications, pawls are used as the element between two rotary parts of the clutch that transmit torque in one direction or the other. The pawls are held in one race and the other race has teeth that at least one or more of the pawls engage in one direction of relative rotary motion between the races (the driving direction) but not in the other direction (the free wheeling direction). The pawls are typically biased using an accordion or compression spring in the front of the pawl that biases it into the engaged position with the teeth.

This design requires much attention to the design of the pawl to make a clutch that allows the pawls to remain assembled in one race in the absence of the other race that normally keeps the pawls assembled to the one race. Overrunning clutches for bicycles sometimes use a rearward biasing of the pawls using a garter spring that fits within a groove that is provided in the pawls at an engagement angle. This is a costly method in biasing pawls, but reduces the total number of parts of the final assembly.

Rearward biasing by the springs in a pawl-type overrunning clutch allows designers more flexibility in the design of pawls. While accordion spring-type clutches that bias the pawls to an engagement position under the front portion of the pawl are inexpensive to manufacture, care must be taken in how the pivot point and the rear of the pawl pocket are designed if the pawls are required to remain assembled when the toothed race is removed.

SUMMARY OF THE INVENTION

The present invention provides an overrunning clutch with a spring that biases the top rear portion of the pawl and wherein the spring acts as a mechanism to trap the pawl when the two races of the clutch are disassembled. This configuration allows the pawl to remain assembled in the absence of the toothed race. This design allows the designer greater flexibility in the design of the pawl in an overrunning clutch. The envelope that the pocket geometry requires can also be lowered in some cases which can reduce the size or packaging requirements for the clutch.

In a preferred aspect, the invention employs flat or ribbon springs to bias the pawl at the rear of the pawl. Each spring is held in the race to which the pawls are assembled and holds the associated pawl in the race. Most preferably, the pawls are assembled to the inner race, at the outer circumference of the inner race, so they engage the outer race in the driving direction and overrun it in the free wheeling direction.

In another aspect, the invention enables pawls to be made so that they are self-centering in the pockets or the race in which they are received. When pawls are running at speed, the pawl can shift in various directions depending on the design of the pawl and pawl pocket, and the clearance needed for operation. Using the invention, the pawls can be made to seat themselves in the pocket in a radial direction in line with the pivot point. This can be achieved with other methods using accordion springs, but is made simpler with the new method because of the clamping action of the spring.

The foregoing and other objects and advantages of the invention will appear in the detailed description which follows. In the description, reference is made to the accompanying drawings which illustrate a preferred embodiment of the invention.

BRIEF DESCRIPTION OF THE DRAWINGS

FIG. 1 is a perspective view of an overrunning clutch of the invention;

FIG. 2 is a detail fragmentary view of the top portion of the clutch of FIG. 1;

DETAILED DESCRIPTION OF THE PREFERRED EMBODIMENT

Figure 3:
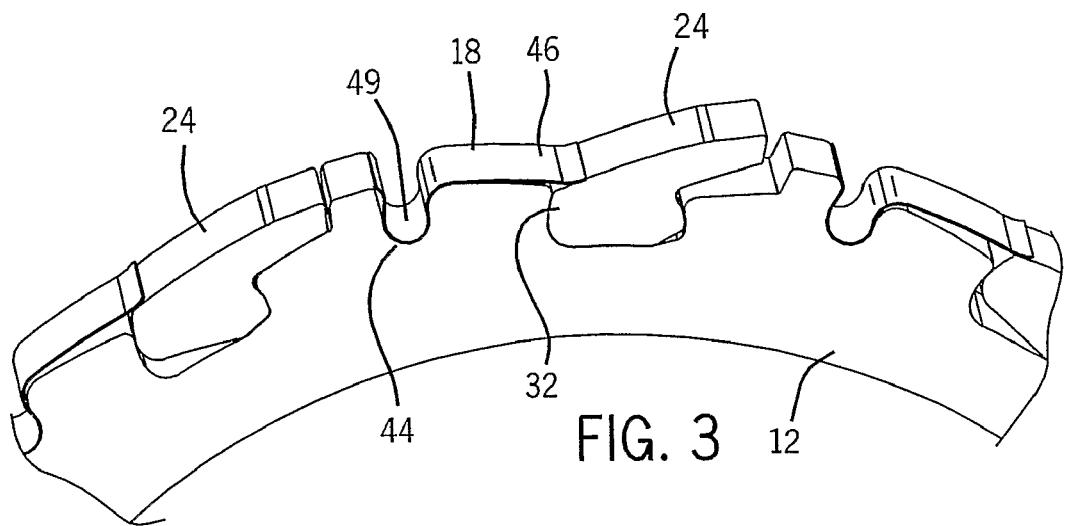
FIG. 3 is a view like FIG. 2 but with the outer race removed.

FIG. 1 illustrates a clutch 10 of the invention including an inner race 12, an outer race 14, pawls 16, and springs 18. In the embodiment illustrated, there are twelve pawls 16 and a corresponding number of springs 18, one to bias each corresponding pawl to an engaged position. Each pawl 16 is received in a pawl-receiving recess 20 that is formed in the inner race 12. FIGS. 1 and 5 show one shape 20 of pawl receiving recess and FIGS. 2 and 3 show another shape 22. The recesses 20 or 22 conform to the shape of the particular pawl 16 (FIGS. 1 and 5) or 24 (FIGS. 2-4) to provide mating shapes to permit the respective pawls 16 and 24 to pivot with their rearward end 32 moving downwardly and their forward end 30 moving upwardly into an engaged position in the driving direction (inner race 12 moving clockwise in FIG. 1 relative to the outer race 14).

In the driving direction, one or more of the pawls 16 or 24 engage one or more of the teeth 26 of the outer race 14. In the opposite or free wheeling direction, the pawls pivot with their forward ends 30 moving down, out of engagement with the teeth, and their rearward ends 32 moving up. As used herein, "down" is in a radially inward direction and "up" is in a radially outward direction relative to the axis of the clutch.

Figure 4:
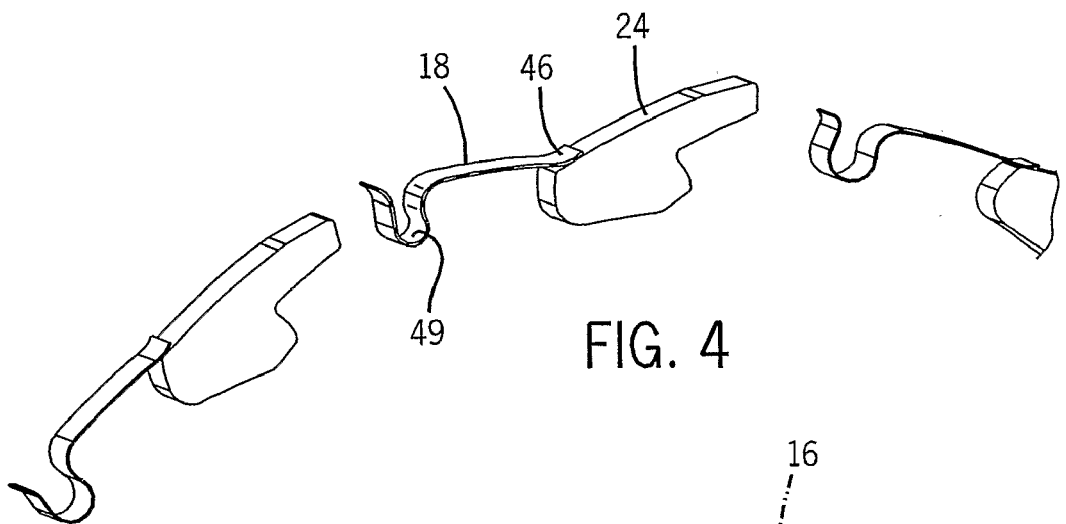
FIG. 4 is a view like FIGS. 2 and 3, but with the outer race and the inner race removed.
Figure 5:
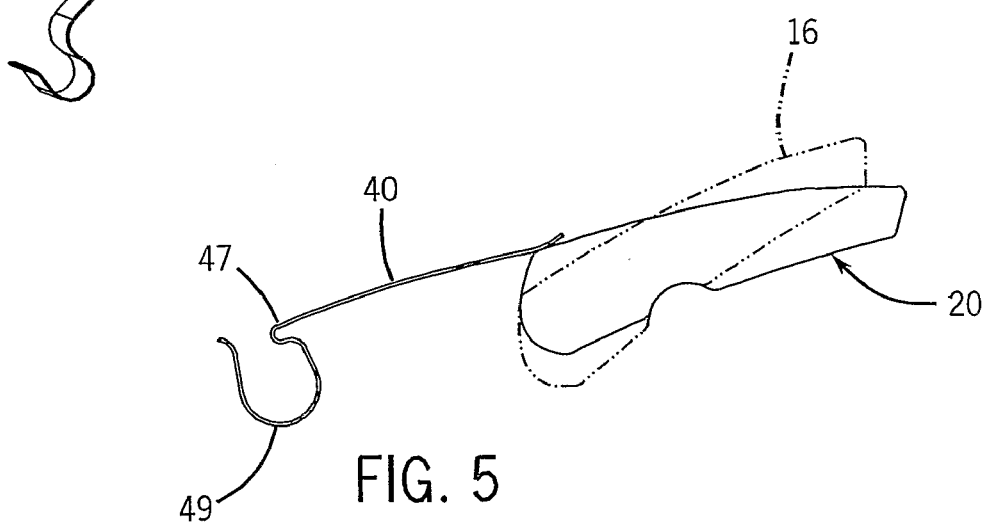
FIG. 5 is a view similar to FIG. 4 but showing an alternate design for the ribbon spring.

Each of FIGS. 2, 3, and 4 show two pawls 24, the rightward pawl being in an engaged position, and the leftward pawl in each figure being in a disengaged position. Each spring 18 is a flat piece of spring steel that is formed to have a shape like the shape illustrated in FIGS. 1-4 or a shape like the shape of spring 40 illustrated in FIG. 5. The retaining recess 42 in the inner race has a shape similar to the spring, having a bulbous portion 44 that tapers in the radially outward direction so that the bulbous portion 49 of the spring 18 or 40 pressing against the bulbous portion 44 of the recess retains the spring in the bulbous portion 44. The end 46 of the spring that extends from the bulbous portion 44 presses on the rearward end 32 of the pawl to exert a radially inward force on the rearward end 32 of the pawl 16 or 24. This, of course, biases the pawl 16 or 24 toward the engaged position, but lets the pawl 16 or 24 overrun the teeth 26 when the inner race 12 is rotated counterclockwise relative to the outer race 14. It is noted that either the inner race 12 or the outer race 14 may be the driving component or the driven component.

In FIG. 5, the spring 40 is shaped to reduce the chance of the spring walking out of the retaining recess. The spring 40 has a shape with a back bent extending portion 47 that more severely closes off the opening into the bulbous portion 44 of the spring and the spring receiving groove, which makes the bulbous portion of the spring 40 less likely to become disengaged from the bulbous portion of the spring retaining recess.

Each ribbon spring 18 or 40 forces its corresponding pawl 16 or 24 into engagement by applying pressure to the rear of the pawl. The springs also clamp the pawls in the pawl receiving recesses so that the pawls remain assembled even in the absence of the outer race. Beveled edges can be added to the pawls and/or the outer race to aid in assembly. If beveled edges are used, by rotating the inner race and pawl assembly in a free wheel direction (counterclockwise relative to the outer race), the beveled edges of the pawls would cause the pawls to collapse toward the disengaged position, which will allow the inner race assembly to slide into the outer race.

Figure 6:
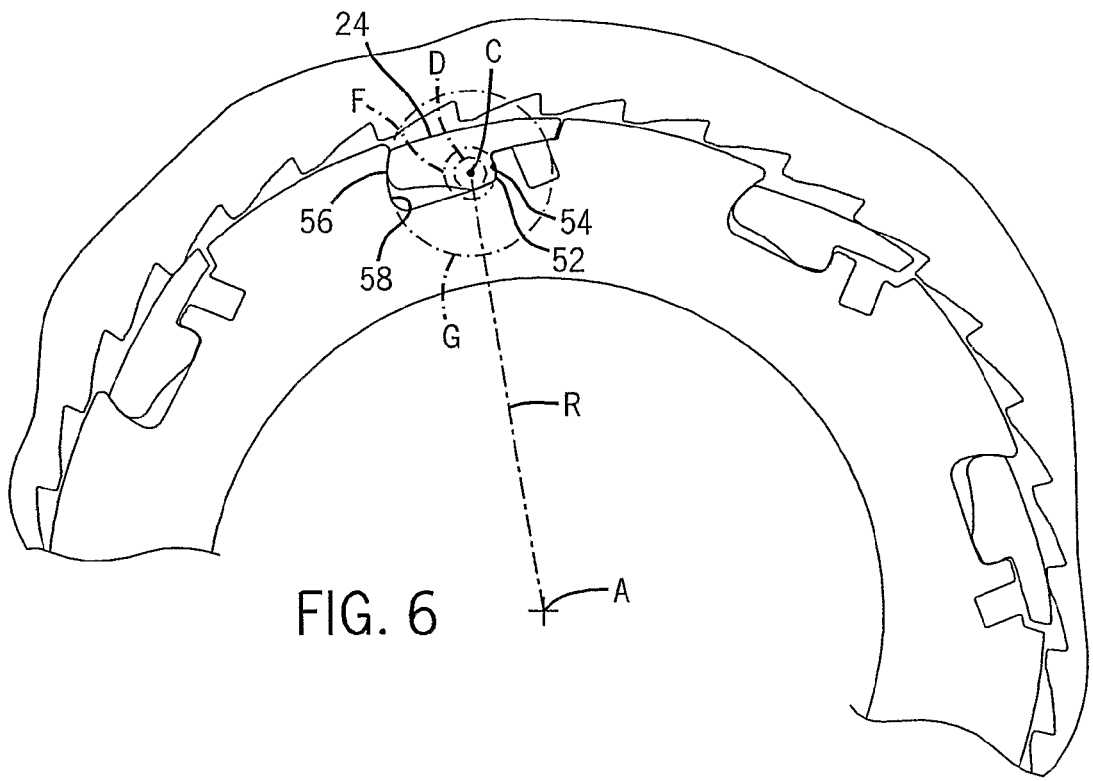
FIG. 6 is a schematic view of a clutch illustrating how pawls are captured in their pockets and are self-centering in operation.
Figure 7:
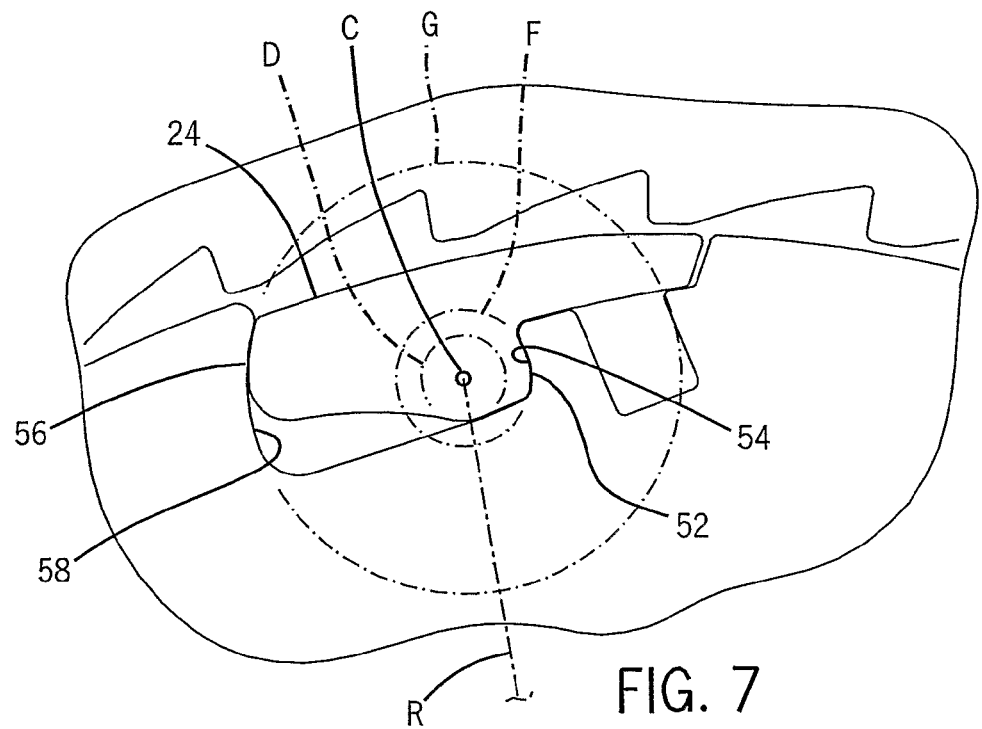
FIG. 7 is an enlarged detail view of the pawl and pocket of FIG. 6.
Figure 8:
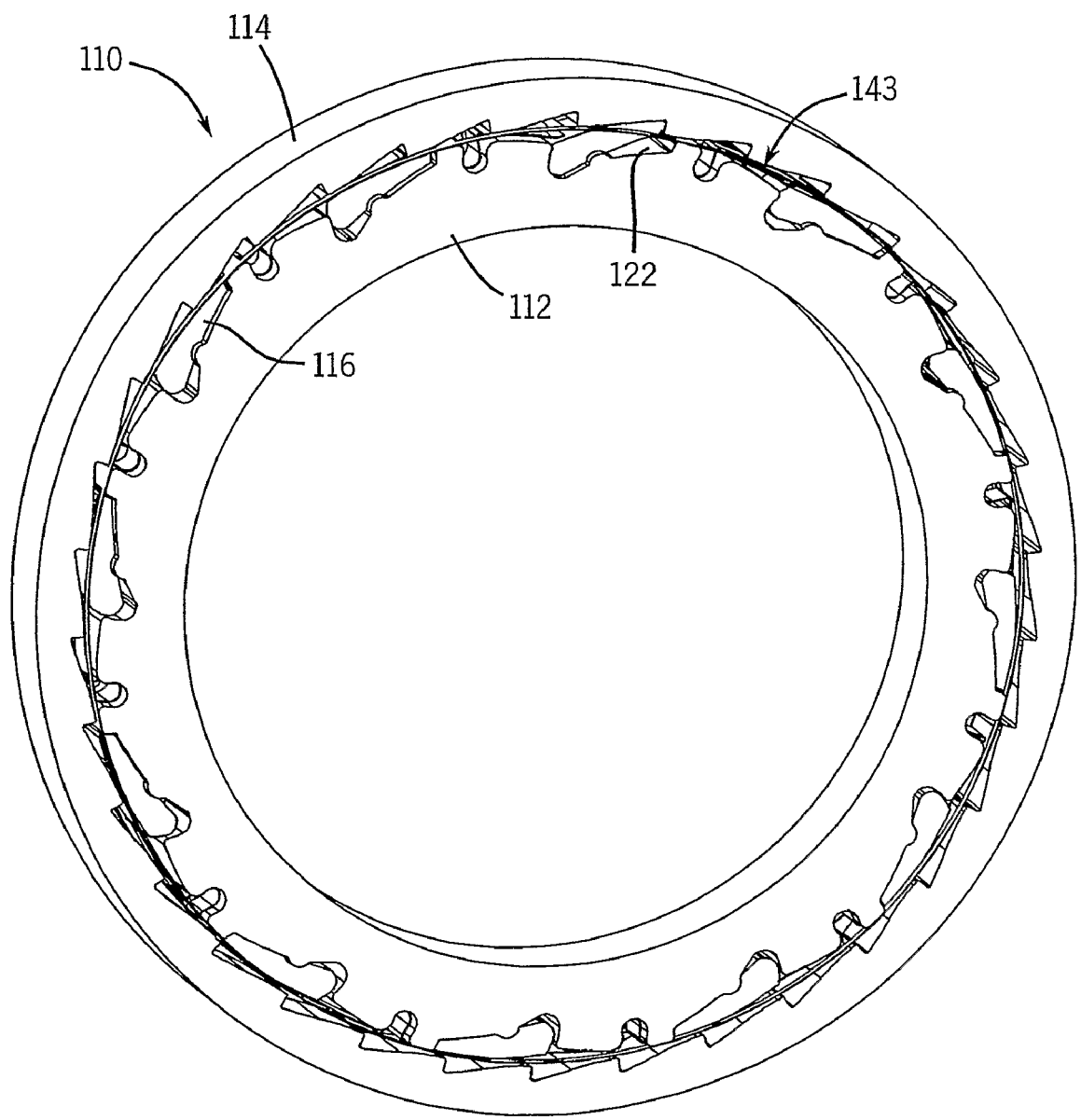
FIG. 8 is a perspective view like FIG. 1, but of an alternate version of a clutch of the invention.
Figure 9:
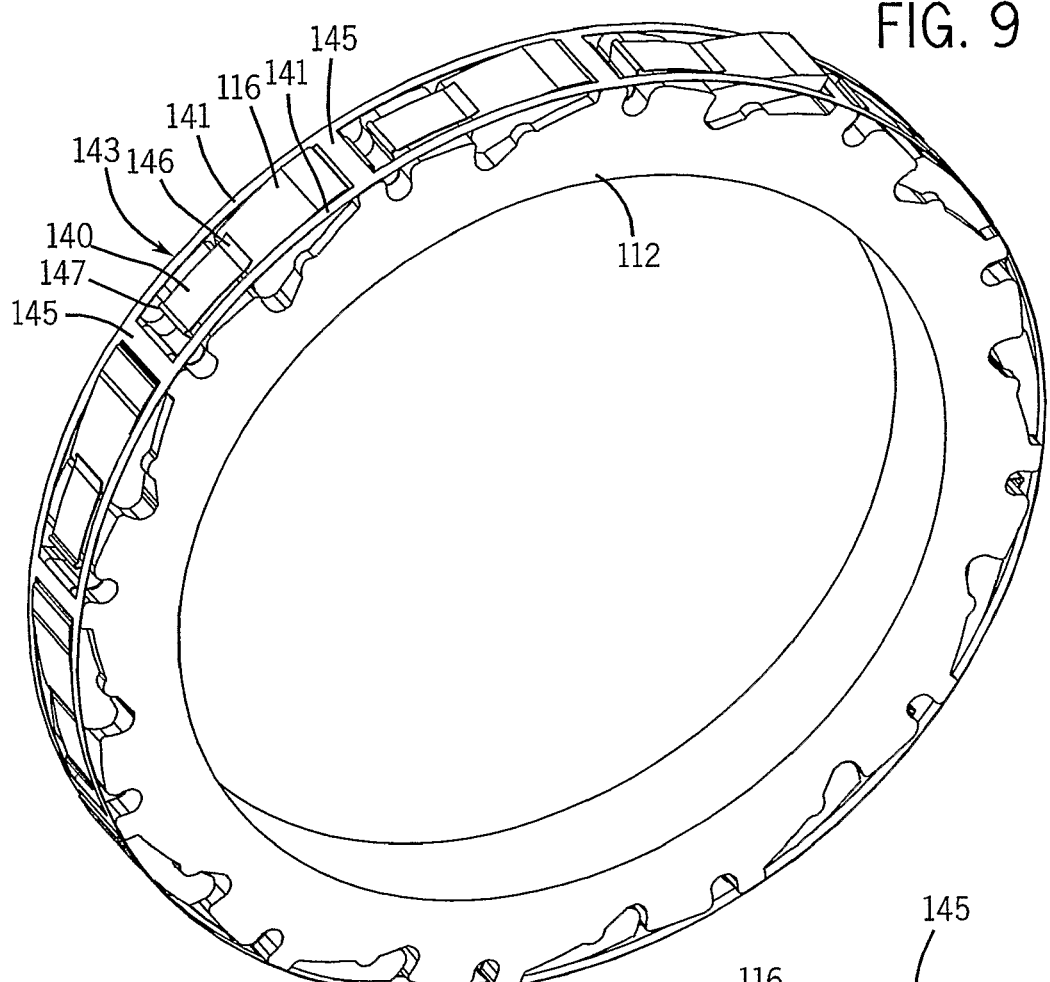
FIG. 9 is a perspective view of the clutch of FIG. 8 with the outer race removed.
Figure 10:
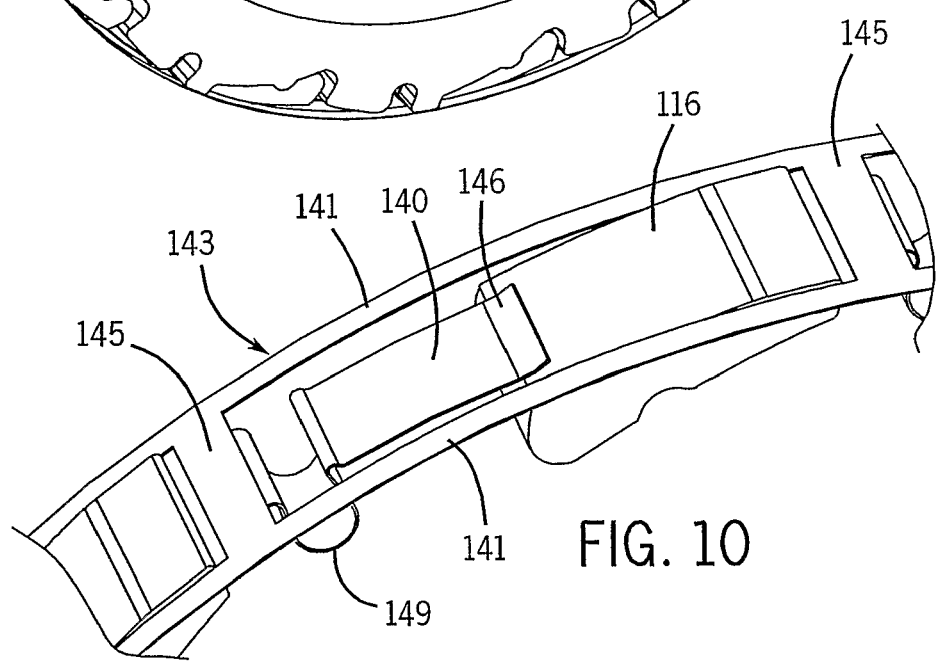
FIG. 10 is a detail perspective view of a portion of the spring band and pawls for the clutch of FIGS. 8 and 9.
Figure 11:
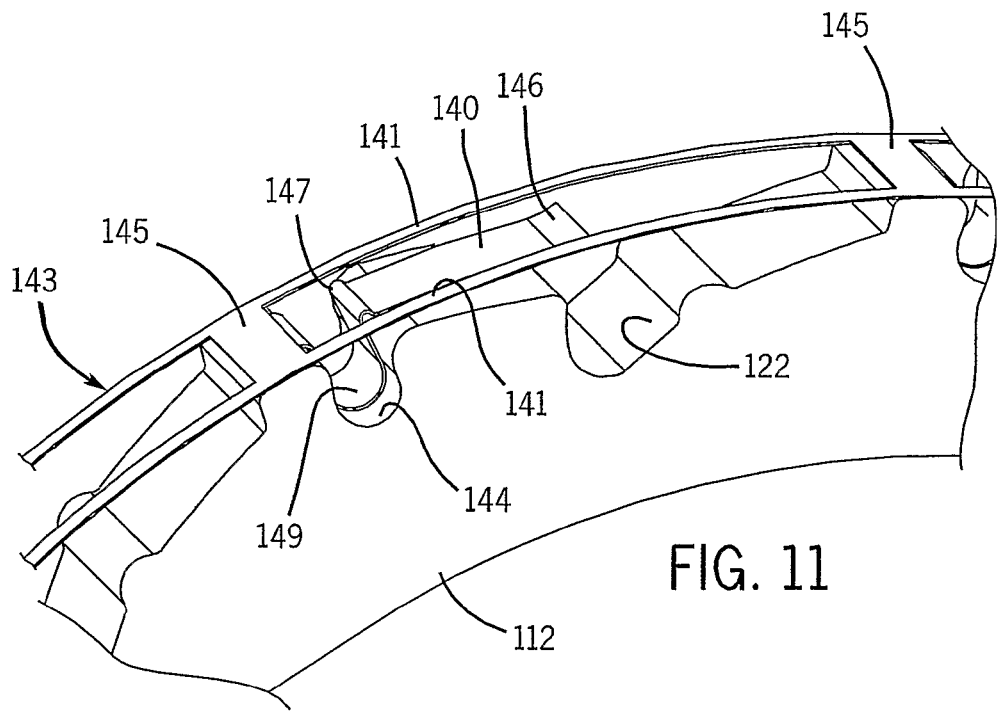
FIG. 11 is a detail perspective view of a portion of the inner race and spring band of the clutch of FIGS. 8-10.
Figure 12:
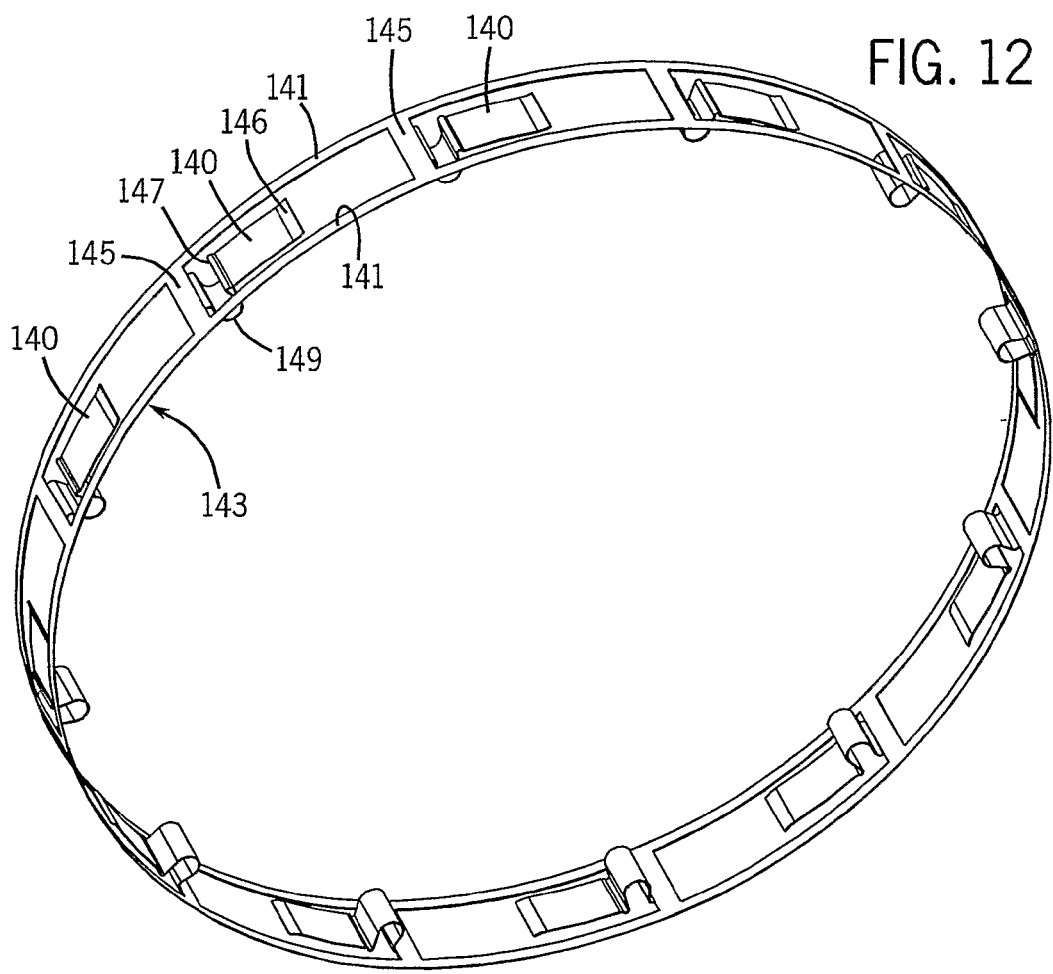
FIG. 12 is a perspective view of the spring band for the clutch of FIGS. 8-11 illustrated alone.

As illustrated in FIGS. 6 and 7, in the pawl 24 of FIGS. 2-4, the pawl geometry and corresponding geometry of the pawl receiving recess 22 can provide a greater degree of axial centering than with the pawl 16 of FIGS. 1 and 5. In FIGS. 6 and 7, point A is an end view of the axis of the clutch, which are the axes of both races. Point C is an end view of the center axis about which the pawl 24 pivots between the disengaged and engaged positions, as indicated by circle D. In operation, when the clutch is being rotated at high speed, the pawls are thrown radially outward by centrifugal force, along radial line R. However, forward mating surfaces 52 and 54 on the respective pawl 24 and recess 22, centered on axis C as indicated by circle F, and rearward mating surfaces 56 and 58 on the respective pawl 24 and recess 22, also centered on axis C as indicated by circle G, capture the pawl 24 in the recess 22 from being thrown radially outwardly. These surfaces 52, 54, 56 and 58 also help center the pawl 24 fore and aft, i.e., axially relative to the major axis of the pawl and relative to the pivot point of the pawl, which positions the pawl in the recess to facilitate proper engagement and disengagement with the teeth of the outer race. This way of capturing and axial centering of the pawls can be applied to a clutch having a rearward biasing spring arrangement as in the invention, described with reference to FIGS. 1-5 and 8-12.

FIGS. 8-12 illustrate an alternate embodiment 110. Elements of the embodiment 110 have been identified with reference numbers of previously described corresponding elements, plus 100.

The embodiment 110 is like the previously described embodiments. In particular, the clutch 110 includes an inner race 112 and an outer race 114. The inner race 112 includes retaining recesses each having a bulbous portion 144 for receiving a spring 140. Each spring 140 includes a bulbous portion 149 received in the bulbous portion 144 of one of the retaining recesses, and each bulbous portion 149 connects to a back bent extending portion 147 of the spring 140. However, the individual springs 140 are all connected on both sides of the pawls 116 by integral straps 141 and bridges 145, which creates a spring band 143 that includes the springs 140, straps 141 and bridges 145. The band 143 surrounds the inner race 112 to help retain the springs 140 and provide axial guidance to the pawls 116.

The pawls 16 and 116 have an advantage that they can be easily assembled to the pawl pockets 22, 122. They can either be inserted into the respective pockets 22, 122 from the end of the pocket, i.e., in a direction parallel to the clutch axis, or in a direction along a chord of the race, directly down into the rear end of the pocket 22 or 122, underneath the end 46 or 146 of the spring.

The springs 18, 40, 140 need not be of constant width, as they are in the illustrated embodiments. By varying the width, different stiffnesses or spring rate characteristics can be achieved, which may be desirable in some applications.

The inner race and the outer race in clutches of the invention can be provided with annular surfaces on one or both axial sides of the pawls that mate with each other in sliding surface contact to guide or pilot the races relative to one another, to keep them centered relative to each other. In other words, the inner race would have an outer cylindrical surface and the outer race would have a mating inner cylindrical surface so as to slide against the cylindrical surface on the inner race, and such pairs of mating cylindrical surfaces could be provided on one or both axial sides of the pawls. Keeping the two races centered and coaxial is important to operation of the pawls, so that they are engaged and disengaged without skewing and consistently.

Also, when engaged, one or more of the pawls may be engaged.

Preferred embodiments of the invention has been described in considerable detail. Many modifications and variations to the preferred embodiments described will be apparent to a person of ordinary skill in the art. Therefore, the invention should not be limited to the embodiments described.

We claim:
1. An overrunning clutch having a first race, a second race rotatable relative to the first race about an axis, a set of pawls between the first race and the second race and a set of ribbon springs between the first race and the second race, one ribbon spring for each pawl and each ribbon spring biasing the corresponding pawl into a position in which the first race and the second race are engaged with each other in a driving direction and are disengaged from each other in a free wheeling direction, the improvement wherein each ribbon spring biases a rearward portion of the corresponding pawl radially inwardly relative to the axis into a pawl receiving recess of one of the two races in which the pawls are received and each ribbon spring is received in a spring receiving recess of the one race.

2. An overrunning clutch as in claim 1, wherein each ribbon spring has a bulbous portion that is received in a bulbous recess of the one race.

3. An overrunning clutch as in claim 2, wherein each ribbon spring has a leg that extends from the bulbous portion and contacts the rearward portion of the corresponding pawl.

4. An overrunning clutch as in claim 1, wherein adjacent ribbon springs are attached to one another with integral straps and bridges.

5. An overrunning clutch as in claim 4, wherein each pawl is received between two straps.

6. An overrunning clutch as in claim 1, wherein the pawls are received in recesses of the one race, and the pawls and recesses have cylindrically shaped surfaces that center the pawl fore and aft in the recess and retain the pawl against radially outward movement.

7. An overrunning clutch as in claim 1, wherein each ribbon spring has a bulbous portion received in a bulbous recess of the one race, an arm and an extending portion between the bulbous portion and the arm.

8. An overrunning clutch comprising:
   an inner race including:
      a plurality of pawl receiving recesses;
      a plurality of spring receiving recesses;
   an outer race surrounding the inner race, the outer race and the inner race being fixed relative to each other in a driving direction and rotatable relative to each other about an axis in a free wheeling direction;
   a plurality of pawls between the inner race and the outer race, each pawl being received in a corresponding pawl receiving recess of the plurality of pawl receiving recesses, and each pawl having a forward portion and a rearward portion; and
   a plurality of springs between the inner race and the outer race, one spring received in a corresponding spring receiving recess of the plurality of spring receiving recesses, one spring engaging a corresponding pawl of the plurality of pawls, and each spring contacting the rearward portion of the corresponding pawl to bias the rearward portion of the corresponding pawl radially inwardly relative to the axis and into the corresponding pawl receiving recess and bias the forward portion of the corresponding pawl radially outwardly relative to the axis to fix the inner race and the outer race relative to each other in the driving direction.

9. An overrunning clutch as in claim 8, wherein each spring is a ribbon spring.

10. An overrunning clutch as in claim 9, wherein each ribbon spring has a bulbous portion that is received in the corresponding spring receiving recess.

11. An overrunning clutch as in claim 10, wherein each ribbon spring includes a leg that extends from the bulbous portion and contacts the rearward portion of the corresponding pawl to bias the rearward portion of the corresponding pawl radially inwardly relative to the axis.

12. An overrunning clutch as in claim 8, wherein adjacent springs of the plurality of springs are attached to one another with integral straps.

13. An overrunning clutch as in claim 12, wherein each pawl is disposed between two straps.

* * * * *